United States Patent [19]
Sarlin et al.

[11] Patent Number: 6,019,316
[45] Date of Patent: Feb. 1, 2000

[54] DEVICE FOR SUSPENDING AN AIRCRAFT TANK

[75] Inventors: Pierre Sarlin, Martigues; Christian Jean Raymond Giraud; Pierre Prud'Homme Lacroix, both of Vitrolles; Francis Averous, Versailles; Jean-Claude Bac, Petit Quevilly, all of France

[73] Assignee: Eurocopter, Marignane Cedex, France

[21] Appl. No.: 09/078,269

[22] Filed: May 13, 1998

[30] Foreign Application Priority Data

May 14, 1997 [FR] France ................................. 97 05917

[51] Int. Cl.[7] .................................................. B64D 37/00
[52] U.S. Cl. .................................. 244/135 R; 244/135 B
[58] Field of Search .............................. 244/135 R, 135 B

[56] References Cited

U.S. PATENT DOCUMENTS

| | | | |
|---|---|---|---|
| 2,519,393 | 8/1950 | Noyes | 244/135 B |
| 2,558,807 | 7/1951 | Bailey | 244/135 B |
| 2,816,725 | 12/1957 | Swanson | 244/135 B |
| 3,843,078 | 10/1974 | Schon et al. | 244/135 B |
| 4,214,721 | 7/1980 | Burhans, Jr. et al. | 244/135 B |
| 4,865,096 | 9/1989 | Schober et al. | 244/135 B |

*Primary Examiner*—J. Woodrow Eldred
*Attorney, Agent, or Firm*—Marshall, O'Toole, Gerstein, Murray & Borun

[57] ABSTRACT

The invention relates to a device for suspending a helicopter tank, the tank comprising a container which possesses a top wall, a bottom wall, and side walls forming a closed volume which is designed to be placed in a compartment of the helicopter, the compartment having at least one partition adjacent to the top portion of the container. The device comprises at least one fastening made of a material that absorbs energy by plastic deformation, which fastening is fixed firstly to the partition of the compartment and secondly to one of said walls of the container so that in the event of a violent shock it limits the displacement and the acceleration of the container relative to the partition of the compartment by plastic deformation of the fastening.

13 Claims, 3 Drawing Sheets

DEVICE FOR SUSPENDING AN AIRCRAFT TANK

FIELD OF THE INVENTION

The present invention relates to a device for suspending an aircraft tank, in particular a helicopter tank, the tank comprising a container having a top wall, a bottom wall, and side walls forming a closed volume which is designed to be placed in a compartment of the aircraft, the compartment comprising at least one partition adjacent to the top portion of the container.

BACKGROUND OF THE INVENTION

For reasons of endurance, commonly-encountered helicopters may possess a plurality of fuel tanks together with a baggage hold for storing small items of equipment.

In such apparatuses, it is common for the tanks and the hold to be situated behind the passenger cabin. In addition, for practical reasons, the floor of the baggage hold may be situated level with the floor of the passenger cabin, thus making it possible for the passengers to access the baggage.

An architectural configuration that makes it possible to satisfy the above requirements consists in subdividing the tanks into two groups, a top group disposed above the hold and a bottom group placed beneath it.

Nevertheless, whatever their positions, the fuel tanks must comply with the requirements of aviation regulations concerning safety.

In particular, the mass of fuel contained in the top group of tanks must not, in the event of a crash, exert thrust on the structural elements of the helicopter in such a manner as to severely injure any surviving passengers.

In addition, the tanks must avoid being punctured so that fuel is not spread over the hot parts of the helicopter since that could cause a fire.

SUMMARY OF THE INVENTION

An object of the present invention is to provide one or more fuel tanks satisfying the constraints of the above-mentioned aviation safety standards, without it being necessary to overdimension the walls of the tank(s) relative to the strength required to withstand the fuel pressures that can be obtained in flight or on landing.

To this end, the invention provides an aircraft tank suspension device of the above-specified type, essentially characterized in that it comprises at least one fastening made of material that absorbs energy by plastic deformation and that is fixed firstly to the partition of the compartment and secondly to one of said walls of the container to act, in the event of a violent shock, to limit the displacement and the acceleration of the container relative to the partition of the compartment by the fastenings deforming plastically.

Thus, in the event of the helicopter crashing, the kinetic energy due to the mass of fuel in the tank on impact will be absorbed in part by the plastic deformation of the fastenings which hold the fuel tank above the baggage hold and the bottom tank group.

Advantageously, the suspension device of the invention can further include one or more of the following characteristics:

the device comprises at least one external fastening fixed to said at least one partition adjacent to the top portion of the container and to at least one of the side walls outside the closed volume;

the compartment comprises at least one top partition placed above the bottom wall of the container and the device further comprises at least one internal fastening fixed via a top end to the top partition of the compartment and via a bottom end to the bottom wall of the container, said internal fastening being situated inside the closed volume;

the external fastening is passed through a ring designed to be engaged on a hook supported by said at least one partition of the compartment;

the external fastening comprises two halves extending from the ring, both halves being secured to the side wall of the container;

the hook includes closure means designed to prevent the ring disengaging from the hook;

the top end of the internal fastening includes a clamp having an eye for securing in a recess of the top partition of the compartment by means of a ball pin;

the internal fastening passes in sealed manner through the top wall of the container;

the top end of the internal fastening is fixed to the top wall of the container by the clamp;

the external fastening, the internal fastening, and the container are all made of the same flexible material;

the device comprises a plurality of external fastenings distributed over the side walls of the container and/or a plurality of internal fastenings distributed in the closed volume of the container;

the external fastenings are connected to one another to form a net for suspending the container; and the container is supported by a bottom partition of the compartment, the bottom wall of the container having retaining means holding it to the bottom partition.

BRIEF DESCRIPTION OF THE DRAWINGS

An embodiment of the invention is described below with reference to the accompanying drawings, in which.

DETAILED DESCRIPTION OF A PREFERRED EMBODIMENT

Figure 1:
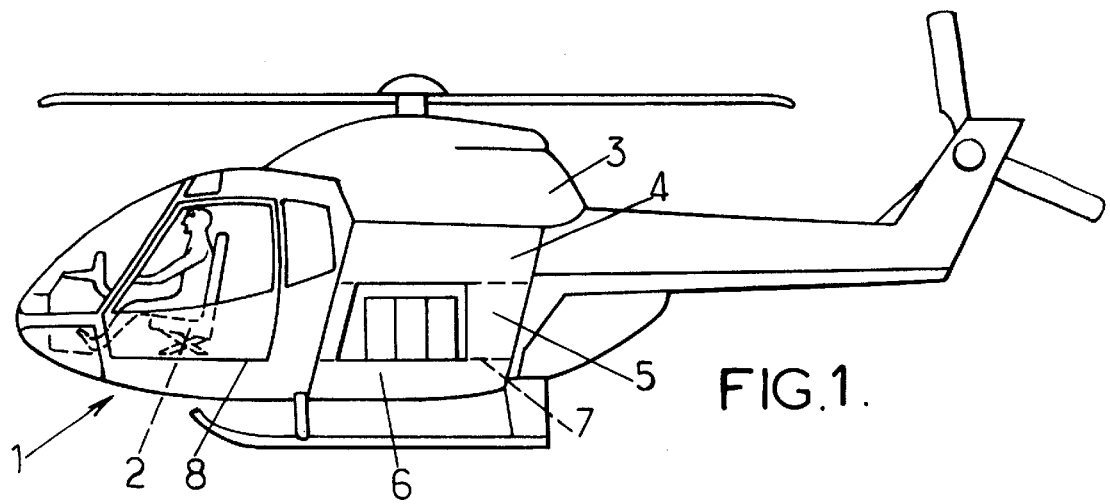
FIG. 1 is an overall view of a helicopter on which there is installed a tank provided with the suspension device of the present invention.

The helicopter 1 shown in FIG. 1 comprises in conventional manner a passenger cabin 2 with, behind the cabin, and superposed one on another: an engine and transmission compartment 3; a first tank compartment 4; a baggage hold 5; and a second tank compartment 6. The baggage hold 5 has a floor 7 situated on the same level as the floor 8 of the passenger cabin 2 to facilitate access to the baggage hold 5 from the cabin 2.

Figure 2:
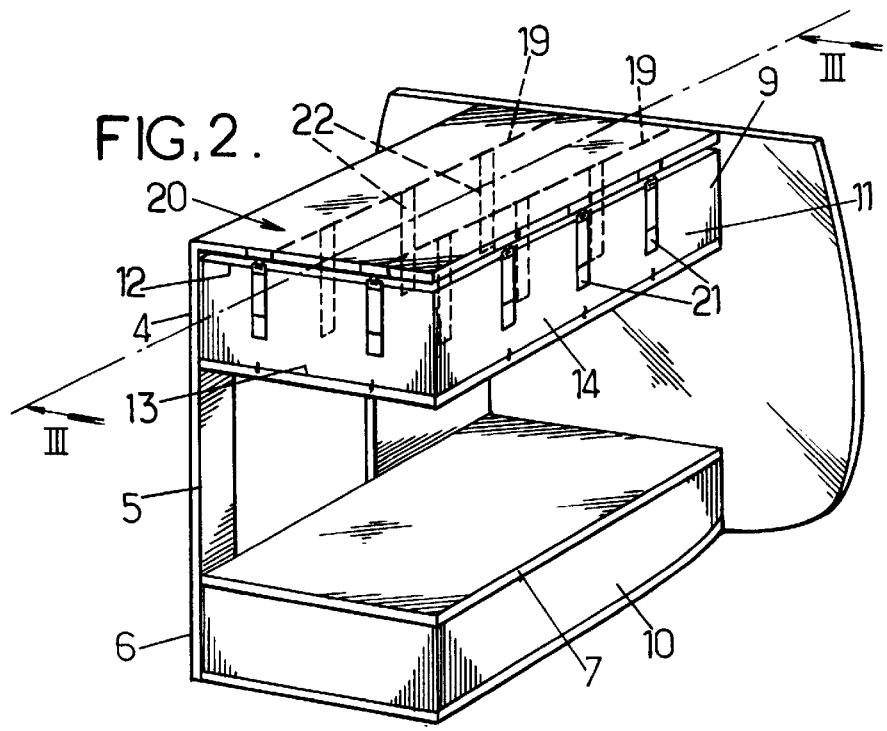
FIG. 2 is a perspective view of the tank provided with the suspension device of the present invention, with the side walls of the baggage hold compartment and of the compartments in which the fuel tanks are placed being removed for reasons of clarity, as is the system for providing communication between the two fuel tanks.

FIG. 2 shows that each of the tank compartments 4 and 6 houses a respective fuel tank, namely a top tank 9 and a bottom tank 10.

The top fuel tank 9 is constituted by a container 11 defining a closed volume and possessing a top wall 12, a bottom wall 13, and side walls 14. The tank is made of a flexible material, e.g. constituted by a film of polymer material having good sealing characteristics relative to liquids and vapor, with both faces thereof being covered in an elastomer or a plastomer material, together with a layer of woven or non-woven textile laminate. Advantageously, the film of polymer material is a polyamide or an equivalent material, and it may be covered in rubber or in polyurethane. The film provides the functions of sealing relative to liquids and to vapors, and the function of protecting the textile laminate from the fuel, while the textile laminate provides the tank with mechanical strength while nevertheless being plastically deformable.

Figure 3:
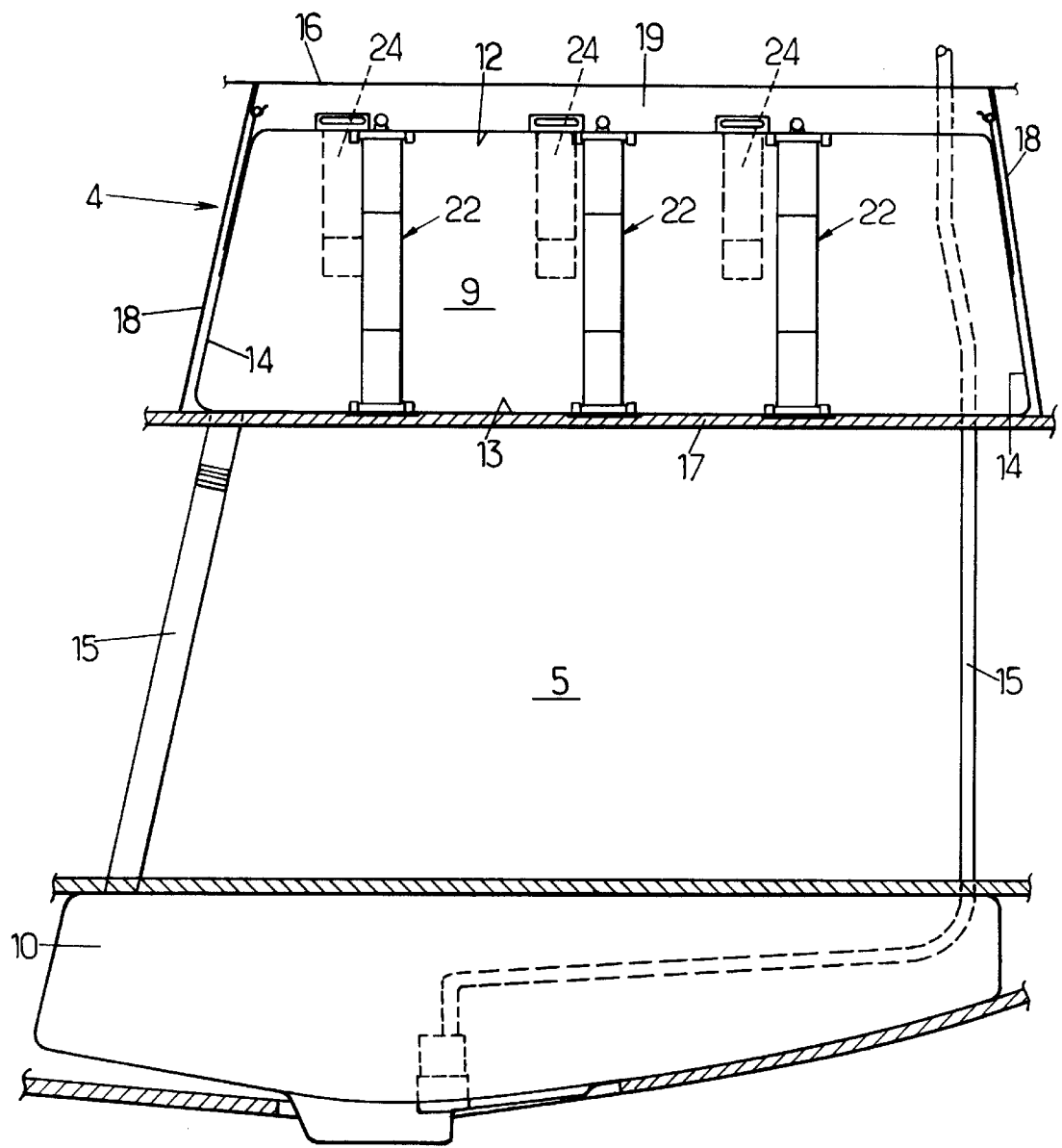
FIG. 3 is a section view on line III—III of FIG. 2.

The tank compartment 4 shown in FIGS. 2 and 3 is also constituted by a top partition 16, a bottom partition 17, and side partitions 18. The top partition 16 constitutes a floor for the engine and transmission assembly (not shown) of the helicopter, and it is reinforced with IPN I girders 19. The bottom partition 17 supports the tank 9 and separates the tank compartment 4 from the baggage hold 5. The top partition 16 and the side partitions 18 are adjacent to the top portion of the fuel tank 9.

The two fuel tanks 9 and 10 are in fluid communication via a conventional feed device 15. This device includes four pipes placed at the ends of the tanks.

In addition, the fuel tank 9 is suspended by a suspension device 20 of the present invention. This device, as shown in FIG. 2, is constituted by ten external fastenings 21 that are substantially regularly distributed over the side walls 14 of the tank 9, and six internal fastenings 22 that are substantially regularly distributed inside the closed volume of the tank 9. The external and internal fastenings 21 and 22 are distributed as regularly as possible while making allowance both for space constraints associated with members for emptying and/or filling the tanks and forming parts of the feed device 15, and fixing points for fixing the engine unit and the power transmission to the top partition 16.

Figure 6:
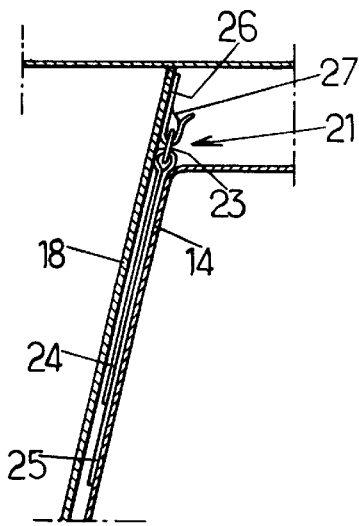
FIGS. 6 and 7 are respectively a side view and a front view of the external fastenings fixed to the side partition of the tank compartment and to the side wall of the tank container.
Figure 7:
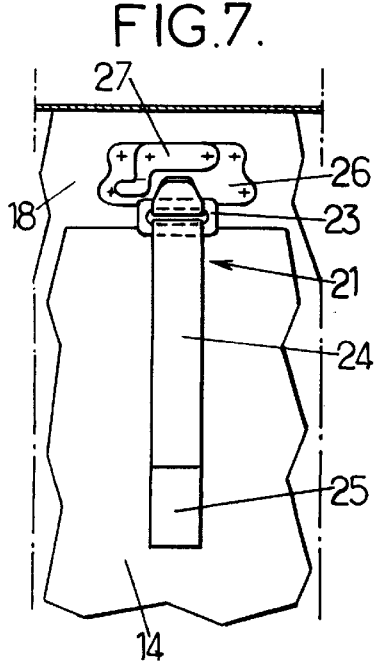

Each external fastening 21 is constituted (see FIGS. 6 and 7) by a strap passed through a ring 23 with the two halves 24 and 25 of the strap being placed one on the other and against the side wall 14 of the tank 9 to be sewn and vulcanized to said side wall, with the strap being made out of the same flexible material as the fuel tank.

The strap 21 is secured to the side partition 18 of the compartment 4 by engaging the ring 23 on a hook 26 fixed to the partition 18. To ensure that the ring 23 does not become detached in untimely manner from the hook 26, the opening of the hook is closed by conventional closure means 27, constituted by a flexible blade.

Figure 4:
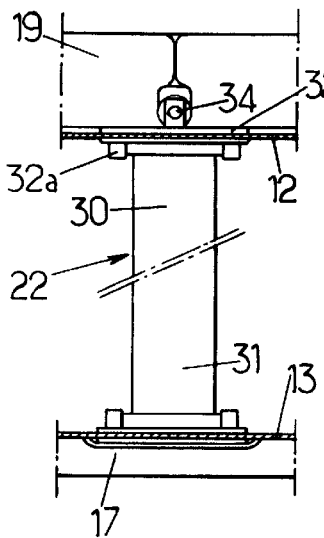
FIGS. 4 and 5 are respectively a front view and a side view of the internal fastenings fixed to the top partition of the tank compartment and to the bottom wall of the tank container.
Figure 5:
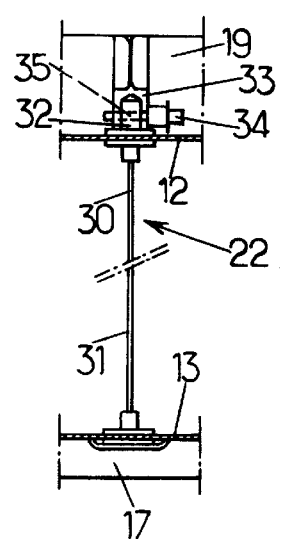

Each internal fastening 22 as shown in FIGS. 4 and 5 is a strap having a top end 30 fixed to one of the girders 19 of the top partition 16 of the compartment 4, and having a bottom end 31 fixed to the bottom wall 13 of the tank 9.

A bracket 32 is applied to the top end 30, said clamp being made up of two plates 32a and 32b which are grouped together and which have the top wall 12 of the container passing between them, being stuck by adhesive and vulcanized so as to ensure that the tank is leakproof. The clamp is designed to be held in a recess 33 formed in the girder 19 by a pin of the type suitable for quick insertion and removal, in particular a ball type pin 34 which passes though an eye 35 in the clamp 32 and through two lugs projecting into the recess 33.

The operation of the suspension device of the present invention is described below with reference to FIGS. 2 and 8.

In normal flight or landing operation of the helicopter, the suspension device is passive. The fuel tank 9 rests normally with its bottom wall 13 on the bottom partition 17 of the compartment 4. The pressure due to he fuel contained in the tank acts normally to the bottom and side partitions 17 and 18 of the compartment 4.

In the event of a helicopter crash, the kinetic energy due to the mass of fuel contained in the tank 9 is absorbed firstly by deformation of the structure of the helicopter and secondly by the internal and external straps 21 and 22 of the suspension device of the invention.

After the bottom wall 17 of the compartment 4 has ruptured, energy is absorbed by the tension and plastic deformation of the straps 21 and 22 which lengthen, possibly by as much as 150% or 200%. The material from which the straps are made also makes it possible to avoid bounce effects.

During a crash, the tank 9 moves downwards and the maximum distance it can move downwards is limited by the extension coefficient of the external and internal straps 21 and 22, thereby making it possible to prevent the top tank 9, which is placed above the bottom tank 10, giving rise to additional damage. The pipes of the feed device 15 that extend between the two tanks 9 and 10 are flexible so as to enable them to follow the downward movement of the tank 9 without giving rise to leaks.

The external straps 21 lengthen simultaneously with the side walls 14 of the tank 9 lengthening and deforming. Any rupture of these side walls in the zone situated at the end of the halves 24 and 25 of the external straps is avoided by selecting the thickness and the plastic characteristics of said halves appropriately relative to the thickness and the plastic characteristics of the side walls.

Figure 8:
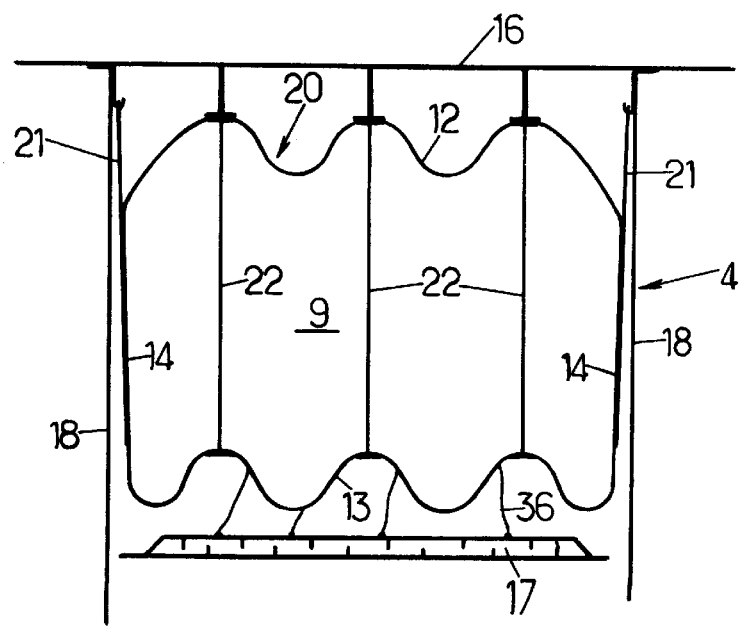
FIG. 8 is a diagrammatic section view through the tank suspension device after a helicopter crash.

In addition, the bottom partition 17 of the compartment 4 is held by the bottom wall 13 of the tank 9 by means of links 36, as shown in FIG. 8.

After a crash, the top and bottom walls 12 and 13 of the tank 9 take on an undulating shape insofar as each of them is kept respectively in contact with the top partition 16 of the compartment 4 via the clamps 32 and is retained by the bottom ends 31 of the internal straps 22.

The suspension device 20 is advantageously provided with external and internal straps that can be installed and removed quickly into and away from the tank compartment 4, thus making it possible to avoid constricting access to the tank during maintenance.

In a variant that is not shown, the external straps 21 are interconnected to form a net in which the tank is suspended.

We claim:

1. A device for suspending an aircraft tank, the tank comprising a container having a top wall, a bottom wall, and side walls forming a closed volume which is designed to be placed in a compartment of the aircraft, the compartment comprising at least one partition adjacent to the top portion of the container, the device being characterized in that it comprises several fastenings made of material that absorbs energy by plastic deformation and that are fixed firstly to the partition of the compartment and secondly to one of said walls of the container by being distributed on the surface of said wall to act, in the event of a violent shock, to limit the displacement and the acceleration of the container relative to the partition of the compartment by the fastenings deforming plastically.

2. A device according to claim 1, characterized in that it comprises at least one external fastening fixed to said at least one partition adjacent to the top portion of the container and to at least one of the side walls outside the closed volume.

3. A device according to claim 2, characterized in that the compartment comprises at least one top partition placed above the bottom wall of the container and in that the device further comprises at least one internal fastening fixed via a too end to the top partition of the compartment and via a bottom end to the bottom wall of the container, said internal fastening being situated inside the closed volume.

4. A device according to claim 2, characterized in that the external fastening is passed through a ring designed to be engaged on a hook supported by said at least one partition of the compartment.

5. A device according to claim 4, characterized in that the external fastening comprises two halves extending from the ring, both halves being secured to the side wall of the container.

6. A device according to claim 4, characterized in that the hook includes closure means designed to prevent the ring disengaging from the hook.

7. A device according to claim 3, characterized in that the top end of the internal fastening includes a clamp having an eye for securing in a recess of the top partition of the compartment by means of a ball pin.

8. A device according to claim 7, characterized in that the internal fastening passes in sealed manner through the top wall of the container.

9. A device according to claim 7, characterized in that the top end of the internal fastening is fixed to the top wall of the container by the clamp.

10. A device according to claim 3, characterized in that the external fastening, the internal fastening, and the container are all made of the same flexible material.

11. A device according to claim 3, characterized in that it comprises a plurality of external fastenings distributed over the side walls of the container and/or a plurality of internal fastenings distributed in the closed volume of the container.

12. A device according to claim 11, characterized in that the external fastenings are connected to one another to form a net for suspending the container.

13. A device according to claim 1, characterized in that the container is supported by a bottom partition of the compartment, the bottom wall of the container having retaining means holding it to the bottom partition.

* * * * *